UNITED STATES PATENT OFFICE 2,671,527

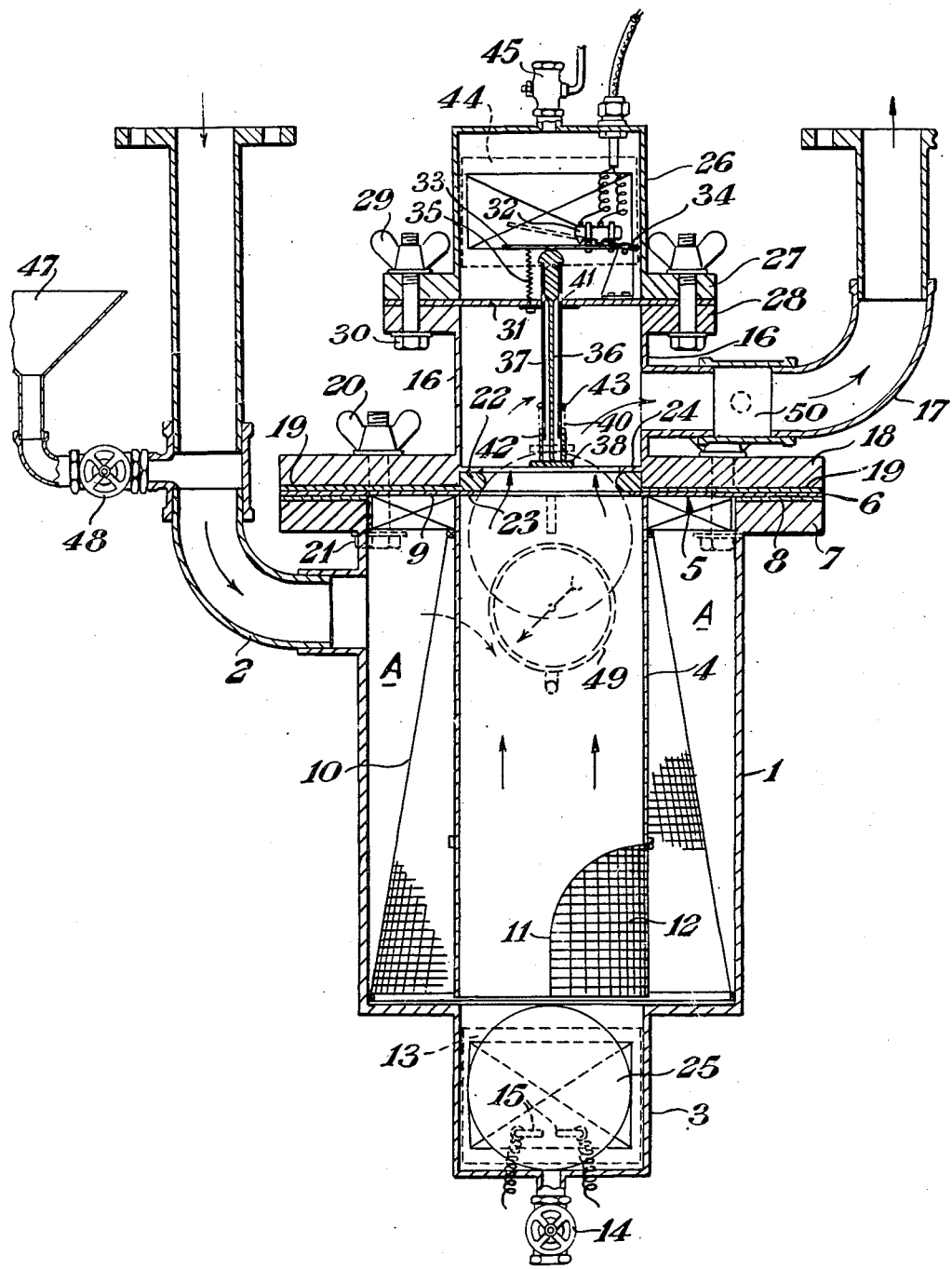

DEVICE FOR DETECTING AND PREVENTING EXCESSIVE ENTRAINMENT IN GASES OF OTHER MATTER

Amos Frederick William Moon, St. Albans, England, assignor to Matthew Hall & Company Limited, London, England, a company of Great Britain Application August 23, 1951, Serial No. 243,313

Claims priority, application Great Britain September 20, 1950

5 Claims. (Cl. 183—41)

This invention relates to devices for detecting and preventing excessive entrainment in gases of other matter. The device is especially adapted to be used in conjunction with a vessel or vessels wherein a continuous partial vacuum is maintained by a gas suction pump or pumps, to prevent liquids, with or without solid materials, contained in the vessel or vessels from being drawn into the gas suction pump or pumps.

The invention is particularly applicable, but not limited, to a system of water borne refuse collection wherein the partial vacuum maintained in the vessel or vessels is used to draw liquids, which may contain solid materials, into the vessel or vessels from distant points through suction conduits.

In such suction systems it is necessary to prevent any of the liquid and any solid materials therein from being drawn into the gas suction pump or pumps (which would happen if the vessel or vessels into which the liquid is being drawn becomes overfilled) because of the consequent damage to the pump or pumps, the probable complete and lengthy breakdown of the system, and the general inconvenience should this happen.

The means at present employed for this purpose consists of a dome formed at the top of each vessel from which gas is extracted, a ball float being mounted in the dome adjacent to the gas outlet from the vessel so that if the vessel becomes completely filled with liquid the ball float rises and closes the gas outlet.

As an added precaution an electrode box is sometimes fitted at the lowest point in the gas suction conduit between the vessel or vessels and the gas suction pump or pumps (hereinafter called the "suction pump"). The electrode box has a baffle plate between the gas inlet and outlet connections to trap any liquid droplets together with any particles of solid materials suspended in gas which has managed to pass the ball float in the dome of each vessel. The liquid with any solids thus trapped collects in the electrode box, and completes an electrical circuit between the electrodes, whereby a warning light is operated showing that liquid is present in the gas suction conduit.

It has been found in practice that the solid materials or scum present in the liquid often prevents the ball float in the dome of each vessel from seating properly in and sealing the gas outlet, and by the time a visual warning is given by the electric light operated by the electrode box and necessary action, such as the stopping of the suction pump, is taken, liquid, with any solid materials present therein, has been drawn into the suction pump. Also, because of the human element involved, the warning light may not be seen in sufficient time to take any action before the suction pump is severely damaged.

It is the primary object of the present invention to provide an improved and more foolproof device for detecting and preventing excessive entrainment in gases of other matter.

The improved device according to the present invention comprises, interposed in a gas suction conduit, a means for separating entrained matter, a collector for matter separated thereby, means for automatically producing a warning signal when the separated matter reaches a predetermined relatively low level in the collector, and means for automatically stopping the gas suction when the separated matter reaches a predetermined relatively high level in the collector.

Preferably the collector extends into a part of the device through which the gas must pass and has a gas outlet controlled by a valve adapted to be automatically closed when the separated matter has risen to a level at or above that at which the gas suction is stopped.

The means for automatically producing the warning signal may comprise electrodes adapted to be bridged by the separated matter when it reaches the predetermined relatively low level.

Preferably the collector contains a float which is buoyant on the separated matter and is adapted to engage and operate a stopping control of a motor actuating the gas suction. The float may be of ball shape and may be adapted to seat in an orifice formed in the collector so as to seal the gas outlet from the collector.

The stopping control preferably comprises a plunger, operatively associated with a switch controlling circuit of an electric motor of a gas suction pump. The switch may be of the mercury type mounted on an arm adapted to be tilted by movement of the plunger.

Preferably the plunger projects through an opening in the wall of a sealed chamber housing the switch and is movable in a hollow guide which is secured in the wall opening. The guide may be provided with holes above and below the wall of the sealed chamber in order to equalize the pressure on the two sides of the wall. If it should happen that there is a leakage past the float-valve into the space in which the hollow guide is situated, provision is made for closing the lower hole or holes in the guide and this may take the form of a sleeve carried by the plunger which will cover the hole or holes when the plunger is engaged and moved by the float.

Preferably the means for separating entrained matter comprises one or more filter screens positioned within the collector between the inlet and outlet thereof. The one or more filter screens may divide the collector into inner and outer compartments and baffle means may be provided so that gas passing into the inner compartment will be caused to deposit matter entrained therein.

The baffle means may comprise a vertical tube of cylindrical section, having an open lower end spaced from but adjacent to the collector bottom. The tube may be positioned over a downwardly extending chamber at the bottom of the collector in which chamber liquid will first collect, and in which the float is normally housed when very little or no liquid has been collected. The electrodes for operating the warning signals may be positioned in this chamber.

The upper end of the tube is preferably extended so as to project from the top wall of the collector with the gas outlet formed therein. The lower end of the tube or a portion of it may be formed as an additional filter screen.

The invention is illustrated by way of example in the accompanying drawing which is a sectional elevation of a preferred embodiment of a detecting and preventing device according to the invention, the device being described with reference to the employment of air suction for drawing waterborne refuse from a distance through air suction lines.

Referring to the drawing the device comprises a cylindrical collector in the form of a vessel 1 having an air inlet 2 and a downwardly extending trap or chamber 3 at the bottom thereof. A baffle tube 4 of a diameter substantially that of the chamber 3 is positioned vertically within the vessel so as to be in line with the chamber 3 with its lower end adjacent to but spaced from the bottom of the vessel 1. The upper end of the tube is formed with a radial flange 5 the peripheral portion 6 of which seats on a rim 7 formed on the top of the vessel with a rubber sealing gasket 8 there-between. The inner portion 9 of the flange 5 forms a lid for the vessel enclosing the annular space A, so that the only outlet from the vessel is through the tube 4. A truncated cone shaped wire screen 10 is fitted around the baffle tube 4 as shown with its upper narrow end secured to the upper end of the baffle tube and its wide lower end contacting the wall of the vessel 1. An inverted U-shaped portion of the lower end of the tube is cut away at 11, the opening being covered by a wire screen 12 and positioned at a point furthest from the inlet 2.

The chamber 3 is provided with an inspection window 13 and a drain cock 14 and is also fitted with two low voltage electrodes 15 whose function will be hereinafter described.

A casing 16, provided with an air outlet 17 connected to a suction pump (not shown), is positioned on the top of the vessel 1 in line with the tube 4 by means of a radial flange 18 formed on the upper casing and seating on the radial flange 5 with a rubber sealing gasket 19 there-between. The two flanges 18 and 5 are secured together to the rim 7 of the vessel by wing nuts 20 and co-operating bolts 21.

A rubber ring 22 is gripped between inwardly projecting radial flanges 23 and 24 formed respectively on the tube 4 and casing 16 to form a seating for a ball float 25 which float is normally housed in the chamber 3 and is adapted to be raised within the tube 4 by water until it seats on the ring 22 in the position shown in the broken line in the drawing, thus sealing the upper end of the tube and preventing egress of water into the upper casing 16 and air outlet 17.

An electrical switch compartment is contained in a cap 26 secured to the top of the casing 16 by means of radial flanges 27 and 28 and wing nuts 29 and co-operating bolts 30. The compartment is divided from the casing 16 by a partition wall 31 which extends over the top of the casing 16 and is gripped between the flanges 27 and 28 where it also forms a sealing gasket. The compartment in the cap 26 houses an electrical switch 32 of the well known mercury type which is secured to one end of a lever 33 pivoted at that end to support 34 so that the switch normally lies horizontally thus making within the switch an electrical circuit. The lever 33 is adapted to be moved upwardly, against the action of a spring 35, by one end of a plunger 36 which moves in a depending guide 37 secured to the partition wall 31. The plunger is actuated by the ball float 25 contacting a tappet 38 on the foot of the plunger as the float is raised by water within the tube 4. Upward movement of the plunger raises the lever 33 and the mercury switch carried thereby at an angle to the horizontal, and causes the electrical circuit to be broken within the switch and thereby to stop, by means not shown, an electric air suction motor.

The guide 37 has holes 40 and 41 therein formed respectively below and above the partition wall 31 in order to equalize the pressure on the two sides of the wall. The lower holes 40 are adapted to be closed by a sleeve 42 secured to the tappet 38, which sleeve slides over the lower portion of the guide having the holes 40 therein, when the plunger is actuated by the ball float, and abuts against a sealing ring 43 fitted around the outside of the guide 37. Thus the holes 40 are effectively sealed and water is prevented from entering the guide and passing through it into the switch compartment in the cap 26, in the event of water leaking past the float 25 when seated on the rubber ring 22.

The cap 26 is provided with an inspection window 44, and an atmosphere inlet valve 45.

The air inlet 2 is provided with a testing funnel 47, and a screw valve 48.

A vacuum gauge may be fitted to the vessel 1 and such a gauge is indicated in broken line at 49 in the drawing.

All internal surfaces of the device are protected against corrosion, and easy access is obtainable to all of its parts.

The operation of the device is as follows:

The device is fitted at the lowest point of the suction conduit, between the suction pump and the vessel or vessels from which air is to be extracted, and in close proximity to the said vessel or vessels.

Air is drawn, by the suction pump into the vessel 1 through the inlet 2 and firstly passes through the wire screen 10, then around the baffle tube 4 and down through the secondary wire screen 12 in the lower end of the tube 4 and thence up through the tube 4 into the casing 16 and the outlet 17. The velocity of the incoming air decreases as it passes through the device, due to the larger size of the air passages therein as compared with the cross sectional area of the suction lines outside the device. Due to this decrease in velocity and due to the change of direction of the air stream before it enters the tube 4, any water entrained therein is separated and falls downwardly and collects in the chamber 3. Solid materials present in the air are also trapped by the screens so that they are prevented from reaching the suction pump.

As the volume of water increases in the chamber 3, the ball float 25 will be raised, such movement being apparent through the inspection window 13. Immediately the level of water in the chamber reaches the two electrodes 15 an electrical circuit is completed and causes the operation of an alarm bell (not shown) and a warning light (not shown) situated in a suitable and convenient position. All that is then necessary is to stop the suction pump, open the drain cock 14 and the atmosphere inlet valve 45 and/or an atmosphere inlet valve 50 provided in the air outlet conduit and screw valve 48 and drain the water from the chamber.

In the event of either the warnings being disregarded, or failing to work due to a mechanical or electrical defect, and of the water filling the chamber 3 and rising in the baffle tube 4, the ball float 25 will rise. When the tube 4 is filled with water the ball float will lift the plunger 36 and operate the mercury switch 32 as already described so as to stop the suction pump.

Practically simultaneously with the operation of the switch the ball float will seat on the sealing ring 22 and close the tube 4. In the event of the pump not stopping when the switch is operated, due to a mechanical or electrical defect, the suction effect of the pump will hold the ball float firmly with a complete sealing action on the seating, and effectively prevent water reaching the suction pump.

Periodical testing of the device is extremely simple. The atmosphere inlet valve 45 and screw valve 48 are opened and water is poured into the vessel 1 by way of the funnel 47. The warning bell should first ring and the warning light should be illuminated. When more water is added, the ball float should rise within the tube 4 and eventually automatically shut off the suction pump.

To test whether the ball float is preventing water entry to the air suction outlet more water is added until its level reaches the top of the funnel. The outlet valve 50 provided in the air outlet conduit is then opened, and if the ball float is seated properly on its seating ring 22 no water should be discharged from this valve. After testing, the water is drained by means of the drain cock 14.

The device thus has seven functions:

(1) Prevention of large solid material being drawn into the suction pump.

(2) Separation of water from air before the air enters the suction pump.

(3) Visual warning that water is present in the air conduits.

(4) Audible warning that water is present in the air conduits.

(5) Means of draining off water which may accumulate in the suction conduits.

In the event of (3) and (4) above being disregarded:

(6) Automatic stopping of the suction pump.

(7) Automatic closing of the air outlet to the suction pump.

The device, though it has been described with particular reference to the employment of air suction for drawing water borne refuse from a distance into a collecting vessel, it may be employed in various other applications of pneumatic-hydraulic plant e. g. chemical plant and hot water systems.

I claim:

1. Apparatus for interposition in a gas suction conduit comprising a receiving vessel having an inlet, a flange at the top of said vessel, a baffle tube depending into said vessel of less girth than the vessel and having means providing communication with the interior of the vessel, an outwardly extending flange at the top of said baffle tube mounted on the first-mentioned flange, a hollow casing having a flange mounted on the second-mentioned flange, means securing said flanges together, an outlet from said casing, said baffle tube and casing adjacent the base of said casing having inwardly extending flanges, a sealing ring mounted by said inwardly extending flanges, and a float positioned in said baffle tube to rise against said sealing ring upon the accumulation of water in the vessel.

2. Apparatus for interposition in a gas suction conduit comprising a receiving vessel having an inlet, a flange at the top of said vessel, a baffle tube depending into said vessel of less girth than the vessel and having means providing communication with the interior of the vessel, an outwardly extending flange at the top of said baffle tube mounted on the first-mentioned flange, a hollow casing having a flange mounted on the second-mentioned flange, means securing said flanges together, an outlet from said casing, a partition in said casing, a guide mounted by said partition and extending across below the same, a plunger to actuate an associated mechanism, said plunger being slidable in said guide, pressure-equalizing holes in said guide on opposite sides of said partition, a tappet slidable on the lower end of said guide normally exposing the lowermost of said holes, said baffle tube and casing adjacent the base of said casing having inwardly extending flanges, a sealing ring mounted by said inwardly extending flanges, and a float positioned in said baffle tube to rise against said tappet to slide it to close said lowermost hole and then engage said sealing ring upon the accumulation of water in the vessel.

3. Apparatus according to claim 2 wherein said plunger has a head suspending it from the top of said guide, said tappet is exterior of said guide, and said guide has a sealing ring engageable by the tappet through the rise of said float.

4. Apparatus for interposition in a gas suction conduit comprising a receiving vessel having an inlet and an outlet, a sealing ring within the apparatus in the line of passage of air therethrough, a float positioned in said apparatus to rise against said sealing ring upon the accumulation of water in the vessel, a guide within the apparatus above said sealing ring, a plunger slidable in said sealing ring and adapted to control associated apparatus, a partition above said sealing carrying said guide, pressure equalizing holes in said guide on opposite sides of said partition, a tappet slidable on the lower end of said guide normally exposing the lowermost of said holes, and said tappet being positioned for sliding movement to close said lowermost hole through the rising movement of said float.

5. Apparatus for interposition in a gas suction conduit comprising a receiving vessel having an inlet, a trap chamber depending from said vessel and of less girth than the said vessel, a baffle tube disposed substantially vertically in said vessel over said trap chamber with its lower end adjacent thereto, said baffle tube being of substantially the same girth as said trap chamber and positioned in line therewith, and being of substantially the same depth as said vessel and having inlet means at its lower end, a casing mounted on said vessel having an outlet therefrom, said casing having an opening establishing communication between the upper end of said baffle tube and outlet, a sealing ring disposed at said opening, and a float in said trap chamber to rise upwardly into and through said baffle tube to the upper end thereof and seat against said sealing ring upon the accumulation of water in the vessel.

AMOS FREDERICK WILLIAM MOON.

References Cited in the file of this patent

UNITED STATES PATENTS

| Number | Name | Date |
|---|---|---|
| 1,335,602 | Pradairol | Mar. 30, 1920 |
| 1,403,650 | Skidmore | Jan. 17, 1922 |
| 1,753,508 | Garrett | Apr. 8, 1930 |
| 1,783,181 | Birkholz | Dec. 2, 1930 |
| 2,058,189 | Stuard | Oct. 20, 1936 |
| 2,406,214 | Garnier | Aug. 20, 1946 |
| 2,511,967 | Campbell | June 20, 1950 |

FOREIGN PATENTS

| Number | Country | Date |
|---|---|---|
| 83,300 | Austria | Mar. 25, 1921 |
| 207,266 | Germany | Feb. 23, 1909 |
| 212,877 | Switzerland | Mar. 17, 1941 |
| 477,786 | Germany | June 15, 1929 |